(12) United States Patent
Hasegawa

(10) Patent No.: US 6,366,783 B1
(45) Date of Patent: Apr. 2, 2002

(54) RADIO PAGING RECEIVER HAVING TIME CORRECTION FUNCTION

(75) Inventor: Kazuhiko Hasegawa, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/095,164

(22) Filed: Jun. 10, 1998

(30) Foreign Application Priority Data

Jun. 10, 1997 (JP) .............................................. 9-152652

(51) Int. Cl.$^7$ ................................................. H04Q 7/20
(52) U.S. Cl. ......................... 455/458; 455/352; 455/459
(58) Field of Search .............................. 455/5.1, 181.1, 455/352, 502, 412, 458, 460, 158.4, 188.1, 186.1; 370/350, 503; 340/825.44, 825.47, 825.27; 368/47

(56) References Cited

U.S. PATENT DOCUMENTS

| | | | | |
|---|---|---|---|---|
| 4,860,268 A | * | 8/1989 | Allgaier et al. ................. | 368/47 |
| 5,005,013 A | * | 4/1991 | Tsukamoto et al. ..... | 340/825.44 |
| 5,043,718 A | * | 8/1991 | Shimura ................. | 340/825.44 |
| 5,049,874 A | * | 9/1991 | Ishida et al. ............ | 340/825.44 |
| 5,083,123 A | * | 1/1992 | Ganter et al. ........... | 340/825.57 |
| 5,261,118 A | * | 11/1993 | Vanderspool, II et al. . | 455/51.2 |
| 5,363,377 A | * | 11/1994 | Sharpe ..................... | 370/100.1 |
| 5,422,863 A | * | 6/1995 | Minowa et al. ................ | 368/47 |
| 5,499,020 A | * | 3/1996 | Motohashi et al. .... | 340/825.44 |
| 5,535,427 A | * | 7/1996 | Miyashita et al. ......... | 455/38.2 |
| 5,552,779 A | * | 9/1996 | Gaskil et al. .......... | 340/825.44 |
| 5,708,781 A | * | 1/1998 | Chiashi et al. ......... | 395/200.17 |

FOREIGN PATENT DOCUMENTS

| | | | | |
|---|---|---|---|---|
| JP | 4-15331 | 2/1992 | ............ | H04B/7/26 |
| JP | HEI 4-72732 | 6/1992 | | |
| JP | 4-72732 | 6/1992 | ............ | H04B/7/26 |
| JP | HEI 7-222221 | 8/1995 | | |
| KR | 95-28333 | 10/1995 | | |
| KR | 96-27436 | 7/1996 | | |

* cited by examiner

*Primary Examiner*—Thanh Cong Le
*Assistant Examiner*—C. Chow
(74) *Attorney, Agent, or Firm*—Scully, Scott, Murphy & Presser

(57) ABSTRACT

After a power source was turned on, when time information is received before message information is received, a time correction is executed on the basis of the time information. After that, when the message information is received, the message information is displayed together with reception time and is stored into a storing unit. When the message information is received before the time information is received, the reception time is stored but is not displayed, and only the message information is displayed. After that, when the time information is received, the time correction is executed on the basis of the time information and the reception time of the message information received so far is corrected.

2 Claims, 3 Drawing Sheets

RADIO PAGING RECEIVER HAVING TIME CORRECTION FUNCTION

BACKGROUND OF THE INVENTION

The present invention relates to a radio paging receiver having a function for automatically correcting time of an internal clock by using time information which is transmitted from a transmission side at a predetermined time interval.

In the radio paging receiver, when it receives message information, the reception message information is generally stored in a memory unit together with reception time of the message. This kind of radio paging receiver has been disclosed in, for example, Japanese Patent Application Laid-Open No. 4-15331 (1992) (hereinafter referred to as a first example) and Japanese Patent Application Laid-Open No. 4-72732 (1992) (hereinafter referred to as a second example). In the radio paging receiver according to the first example, time is manually corrected. When correcting the present time of the clock, the radio paging receiver according to the first example also corrects the reception time which has already been stored, by only correction amount together with the correction.

In the radio paging receiver according to the second example, when accurate present time information is transmitted, the present time of the clock is compared with the accurate present time information. As a comparison result, when time of the clock is deviated, inaccurate reception time which has already been stored is corrected on the basis of the deviation.

The above-mentioned radio paging receiver has the following problems. That is, in the radio paging receiver according to the first example, since time is manually corrected, the reception time of the message information which was received before the time correction is inaccurate unless the user executes the time correction.

On the other hand, the radio paging receiver according to the second example has a function for automatically correcting time. Since time is automatically corrected, the reception time of the message information received before the time correction is inaccurate.

SUMMARY OF THE INVENTION

It is, therefore, an object of the present invention to provide a radio paging receiver which can inform accurate reception time of message information received before a time correction to the user.

According to the present invention, there is provided a radio paging receiver comprising: a receiving section for receiving message information which is transmitted from a transmission side as reception message information and for receiving time information which is transmitted from the transmission side at a predetermined time interval as reception time information; a time counting unit for counting time; a storing section for storing the reception message information together with reception time; a time correcting section for correcting time of the time counting unit on the basis of the reception time information; and a power source.

According to an aspect of the present invention, the radio paging receiver further comprises a display section for displaying only the reception message information when the message information is received before first time information is received after the power source was turned on.

DESCRIPTION OF THE PREFERRED EMBODIMENT

An explanation will be made with respect to a radio paging receiver according to a preferred embodiment of the present invention with reference to FIG. 1. The radio paging receiver according to the embodiment can receive a radio wave according to a signal system of an advanced radio calling system (FLEX-TD). From a transmission side of the advanced radio calling system, message information including personal information, common information, and the like and time information indicative of the present time are transmitted by different frame synchronization signals.

Figure 1:
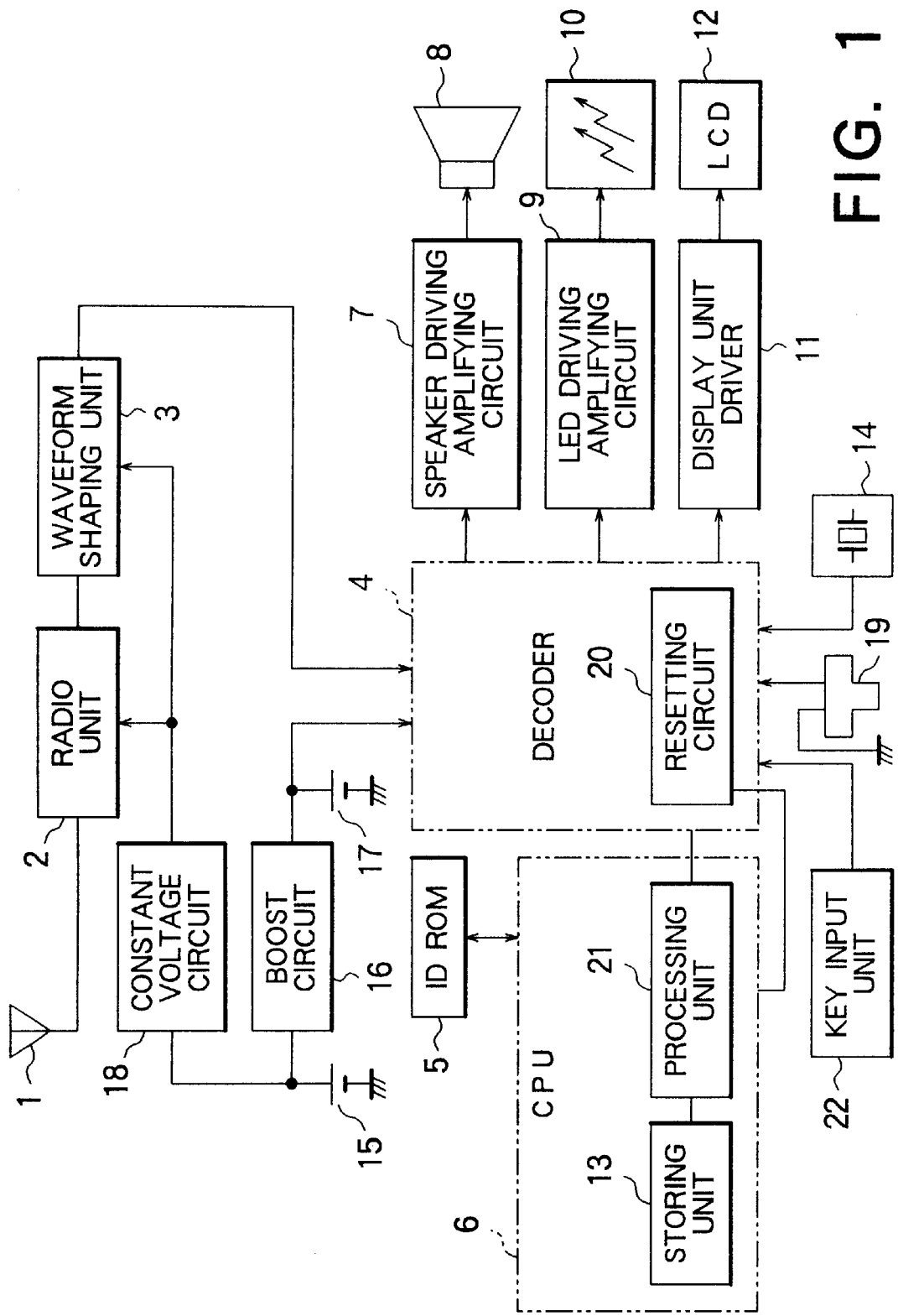
FIG. 1 is a block diagram showing a construction of a radio paging receiver according to a preferred embodiment of the present invention.

In FIG. 1, a radio signal received by an antenna 1 is amplified by a radio unit 2 and is demodulated. The demodulated signal is converted into a signal which can be controlled by a decoder 4 by a waveform shaping circuit 3. The decoder 4 reads out a call number which has been previously stored in a programmable read only memory (ID-ROM) 5 through a CPU 6 and compares the number with the signal from the waveform shaping circuit 3. When the both of them coincide in the comparison, in order to notify the user (person who carries the receiver) of a call, an audio signal is supplied to an amplifying circuit 7, thereby allowing an alarm to be generated from a speaker 8. An LED driving signal is also supplied to an amplifying circuit 9, thereby allowing an LED 10 to be lit on. The decoder 4 supplies dot data to a display unit driver 11, thereby allowing an LCD 12 to display reception message information. The decoder 4 further allows a storing unit 13 in the CPU 6 to store the reception message information. When the user executes the operation to confirm the reception message information, the decoder 4 reads out the reception message information from the storing unit 13 and converts it to the dot data, and after that, supplies the data to the display unit driver 11.

A clock generating circuit 14 generates a clock signal serving as a reference of the operation of the decoder 4. Naturally, the clock signal is also used as a reference clock of a clock function. The radio paging receiver has a battery 15 as a power source to operate the circuits of the receiver. A booster circuit 16 boosts a voltage of the battery 15 and supplies the boosted voltage to the circuits of the receiver. When the battery 15 is exchanged, a backup battery 17 supplies a power to the circuits in place of the battery 15. Even when the battery 15 is disconnected, storage contents in the storing unit 13 are held by the backup battery 17. A constant voltage circuit 18 stabilizes the voltage of the battery 15 and supplies the voltage to the radio unit 2 and the waveform shaping circuit 3. A battery switch 19 is used to turn on the power source of the receiver. A resetting circuit 20 is provided in the decoder 4. The resetting circuit 20 resets the contents of the storing unit 13 when the voltage is decreased to such a value that the contents stored in the storing unit 13 in the CPU 6 cannot be held. A key input unit 22 inputs an instruction for executing to display again the reception message information or the like to the decoder 4.

Figure 2:
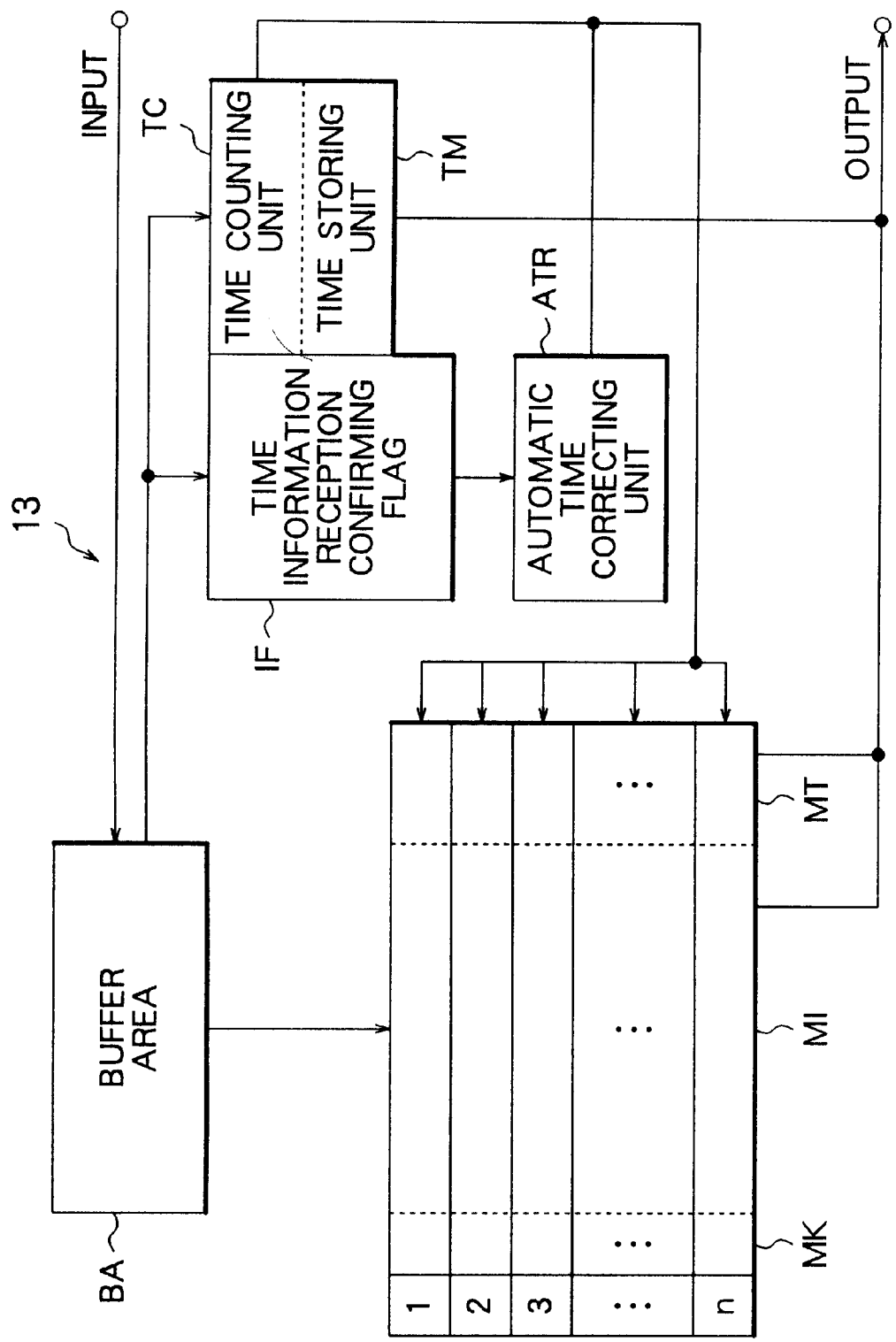
FIG. 2 is a block diagram showing a detailed construction of a storing unit of the radio paging receiver shown in FIG. 1.

The storing unit 13 shown in FIG. 1 will now be described in detail with reference to FIG. 2. The received information is temporarily stored in a buffer area BA through a processing unit 21 in the CPU 6. Whether the information is time information or message information is discriminated in the buffer area BA. When the received information is the time information, a flag of an information kind identifying area MK is set to a low level. When the received information is the message information, the flag of the information kind identifying area MK is set to a high level. When the received information indicates the message information, the message information is stored into a message information reserving area MI and reception time at that time is stored to a reception time storing area MT.

A time information reception confirming flag IF is a flag to indicate a case where an automatic time correcting unit ATR receives time information and corrects time of a time counting unit TC. The time information reception confirming flag IF is also stood just after the correction of the reception time of the message information received before the time information is received. The time information reception confirming flag IF is set to a low level in an initial state. That is, the time information reception confirming flag IF is set to a low level each time when the time information is received and, when the time correction or correction of the reception time of the message information is finished, the flag IF is set to a high level. Time is automatically corrected each time when the time information reception confirming flag IF is set to a low level.

When an operation to watch the received message information is executed by the key input unit 22, the operation is recognized by the processing unit 21 through the decoder 4. When discriminating that an instruction to read out the received message information, the processing unit 21 reads out the reception message information from the message information reserving area MI and transmits it to the decoder 4. At this time, when the time information reception confirming flag IF is at a low level, the time information is not read out from the reception time storing area MT. That is, the reception time is not displayed.

A receiving section is constructed by the antenna 1, the radio unit 2, and the waveform shaping circuit 3. The time counting unit TC corresponds to a time counting section, the storing unit 13 corresponds to a storing section, and automatic time correcting unit ATR corresponds to a time correcting section, respectively. A display section is constructed by the decoder 4, the CPU 6, the display unit driver 11, and the LCD 12. A storage information correcting section is constructed by the decoder 4 and the CPU 6.

Figure 3:
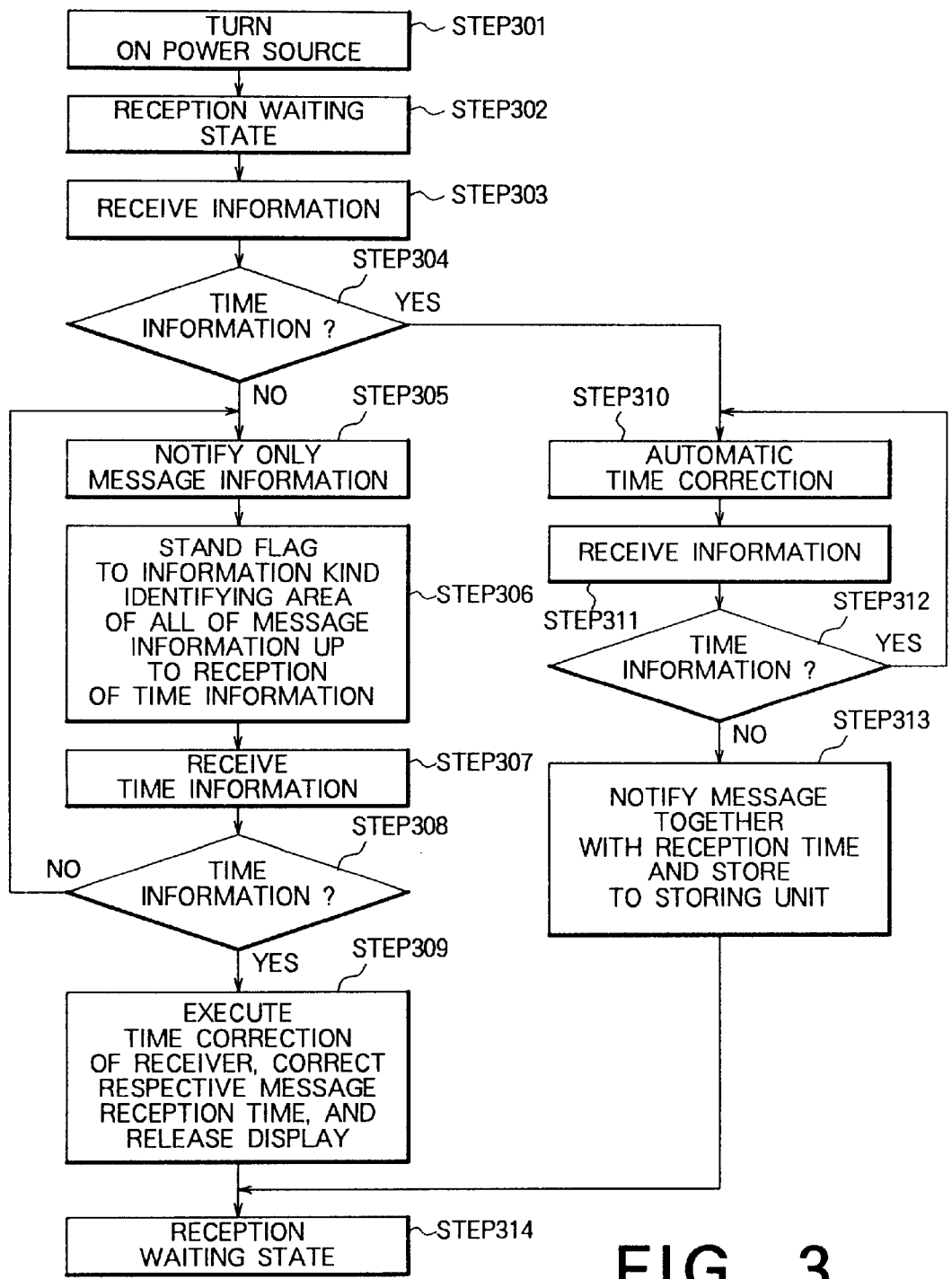
FIG. 3 is a flowchart for explaining the operation of the radio paging receiver shown in FIG. 1.

The operation of the radio paging receiver will now be explained with reference to FIG. 3. When the exchange of the battery 15 or the like is executed and the power supply switch 19 is turned on, the contents in the storing unit 13 is initialized (step 301). In a reception waiting state (step 302), when information is received (step 303), a check is made to discriminate whether the received information is the time information or not (step 304). In the discrimination, when the received information is the time information, time is corrected to accurate time by the automatic time correcting function (step 310). As shown in steps 311 and 312, the processes are executed each time when the time information is transmitted.

After that, when the message information is received, the message information is notified to the user together with the corrected reception time and is stored into the storing unit 13 (step 313).

On the other hand, in the discrimination in step 304, when the information which was first received indicates the message information, the time information reception confirming flag IF is at a low level as it is and time of the clock which the receiver has is not corrected to accurate time. In this case, the notification of the message information reserving area MI is permitted and only the message information is notified to the user (steps 305 to 308). In this case, respective flags in the information kind identifying area MK for all of the message information received until the time information is received are set to a high level. After that, when it is discriminated that the received information is the time information, time of the self clock is corrected. At the same time, reception time of all of the message information received before the time information is received is corrected and the notification to the user is released (step 309). After that, the processing routine is again returned to the reception waiting state (step 314).

As mentioned above, in the embodiment, after the power source was turned on, when the time information is received before the message information is received, time is corrected by the exact time information. After that, when the message information is received, the message information is displayed together with the reception time and is also stored into the storing unit 13.

When the message information is received before the time information is received, the reception time is stored but it is not displayed and only the message information is displayed. After that, when the time information is received, time is corrected by the accurate time information and the reception time of the message information received so far is corrected. Therefore, for a period of time during which time is not corrected, if the message information is received, only the message information is displayed, and after the time correction was executed, reception time is displayed together with the message information. Consequently, there is no case where inaccurate reception time of the message information is informed to the user.

In the above embodiment, although the message information and its reception time are merely displayed on the LCD 12, it is also sufficient that they are generated as audio by an audio synthesis.

What is claimed is:

1. A radio paging receiver comprising receiving means for receiving message information which is transmitted from a transmission side as reception message information and for receiving time information which is transmitted from said transmission side at a predetermined time interval as reception time information, time counting means for counting time, storing means for storing said reception message information together with reception time, time correcting means for correcting time of said time counting means on the basis of said reception time information, a power source, and display means, said time correcting means executing time correction on the basis of the reception time information when first time information is received before the message information is received after said power source is turned on, after which the time correction is executed, wherein when the message information is received, said display means displays the reception message information together with its corrected reception time and said storing means stores said reception message information and said corrected reception time, wherein said display means displays only the reception message information when the message information is received before the first time information is received after said power source is turned on, the reception time of the message information being stored in said storing means but not displayed, after which the first time information is received and the time correction is performed by said time correcting means, said display means displays the reception message information and its corrected reception time.

2. A radio paging receiver as claimed in claim 1, wherein said radio paging receiver further comprises storage information correcting means for correcting the reception time of the reception message information which has previously been received and stored due to the reception of the first time information, when the operation to display the reception message information stored in said storing means is executed before the first time information is received, said display means displays only the reception message information stored in said storing means and, after that the first time information was received and the time correction was performed by said time correcting means, said display means displays the reception message information stored in said storing means and its corrected reception time.

* * * * *